May 24, 1938.  R. CHILTON  2,118,590
REGENERATIVE TRANSMISSION SYSTEM
Filed June 23, 1934  3 Sheets-Sheet 1
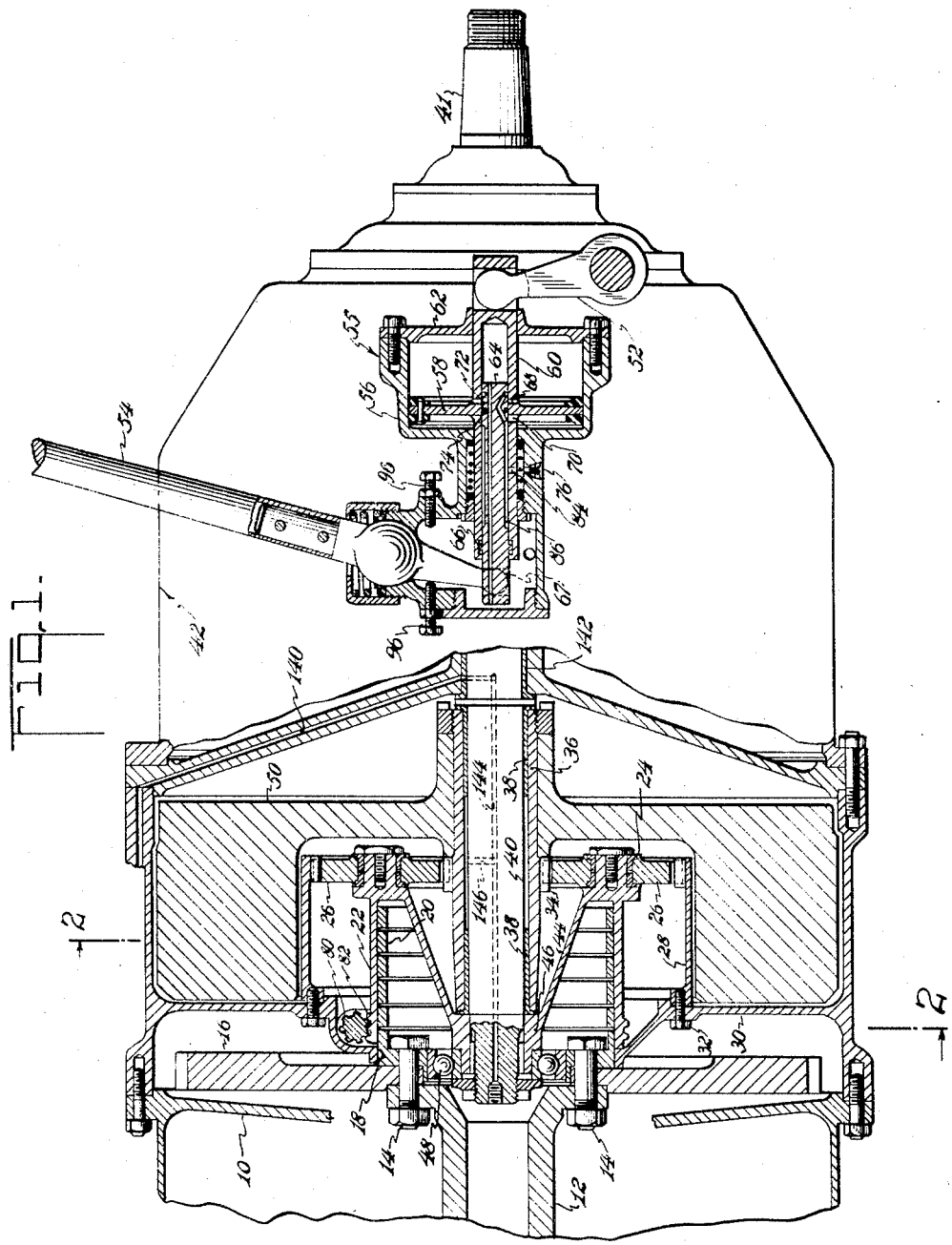
INVENTOR
ROLAND CHILTON
BY
ATTORNEY

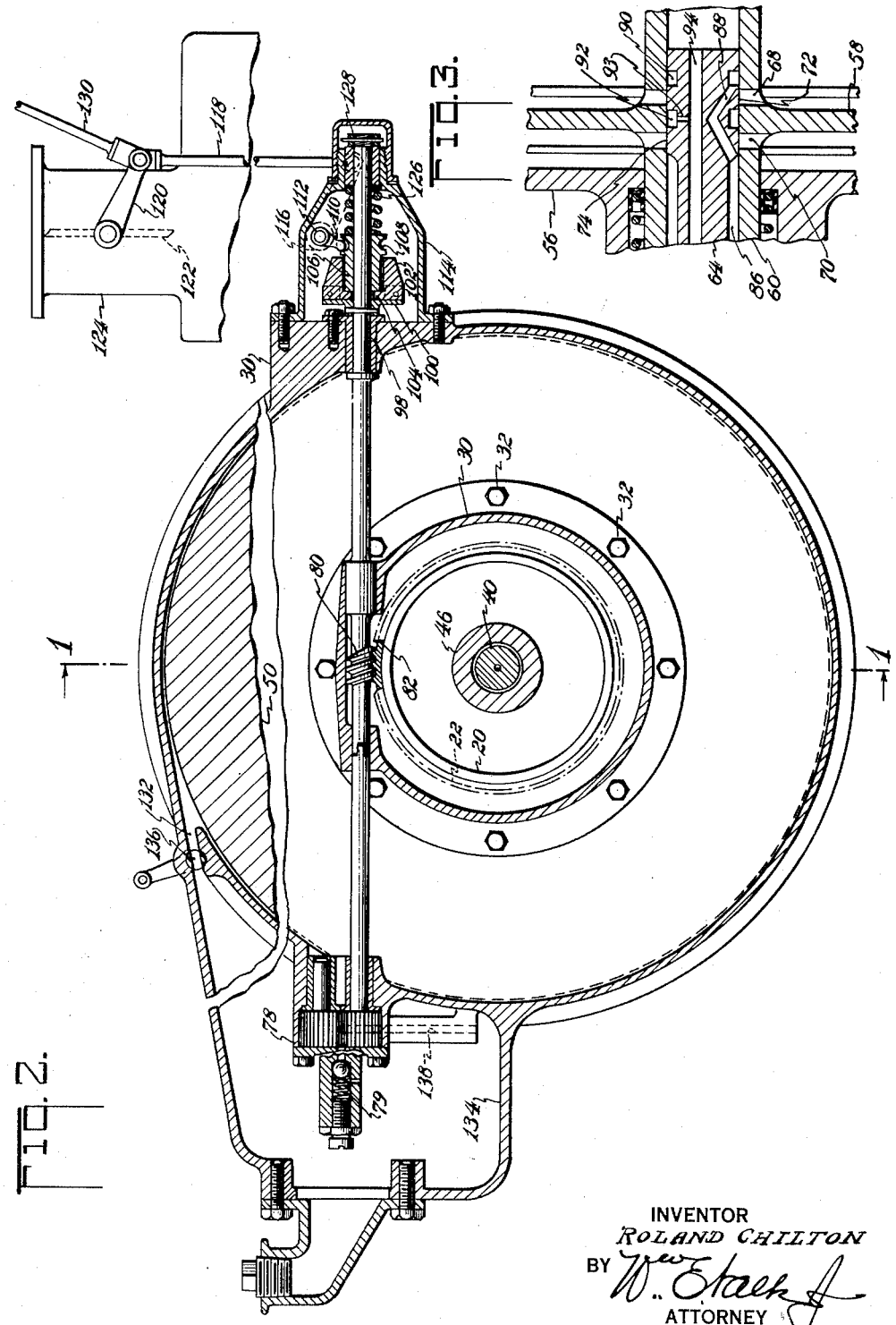

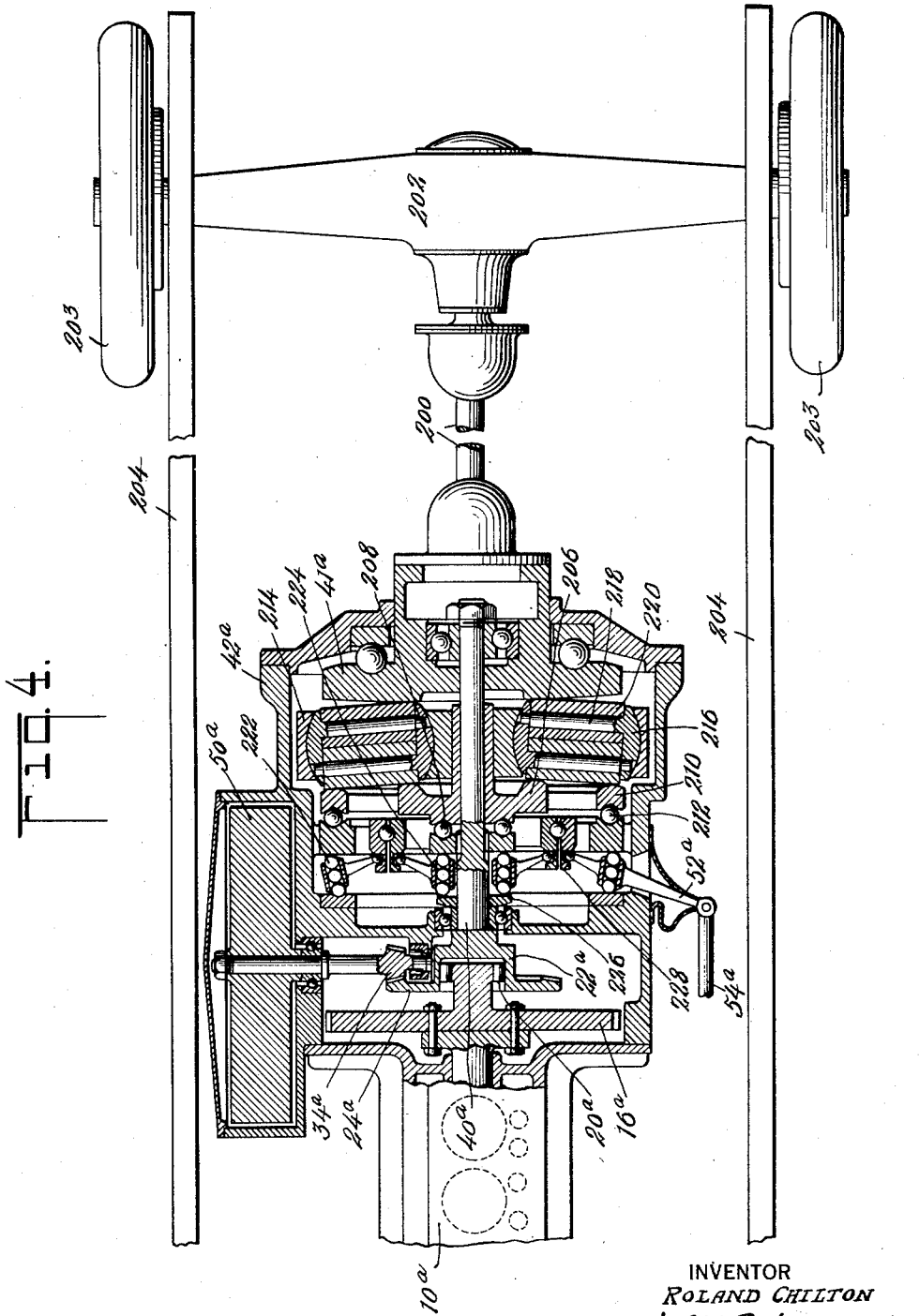

Patented May 24, 1938

2,118,590

UNITED STATES PATENT OFFICE 2,118,590

REGENERATIVE TRANSMISSION SYSTEM

Roland Chilton, Ridgewood, N. J.

Application June 23, 1934, Serial No. 732,182

37 Claims. (Cl. 74—574)

This invention comprises a new rotary power transmission system, and is of general utility wherever a driven mass is to be accelerated and decelerated from a power source. The speed control of automotive vehicles represents one field of application, and the specific embodiment herein described and shown in the drawings illustrates an embodiment suited, for example, to wheel driven vehicles.

The invention includes kinetic energy accumulating means, energizable from a power source, and variable ratio drive means adapted to transmit such accumulated energy to the driven means independently of the rate and time of generation by the power means.

One object of the invention is to provide a simple mechanical transmission system capable of storing energy. Another object is to provide means to release during periods of more-than-average power demand, the energy accumulated during periods of less-than-average demand. An associated object is to permit a reduction in the H. P. capacity necessary in the power plant from the maximum H. P. demand to the average.

A further object is to provide a regenerative transmission system wherein the energy normally lost in braking is recovered for subsequent use. A still further object is to achieve the entire speed regulation of a vehicle, including starting, stopping, accelerating, and decelerating, by means of a single operator's control, in place of the throttle, clutch, gear shift, and brake controls, conventionally used in internal combustion propelled vehicles.

The power demand in rail and road vehicles is intermittent and fluctuating, particularly in local service and in congested districts, wherein the "throttle" is full open for only short periods, inter-spaced by frequent deceleration and use of the brakes, whereby most of the energy stored in the vehicle during acceleration is lost with conventional transmission systems. The continuing trend towards more powerful engines is largely due to the demand for better acceleration performance and such large powers are generally unusable, except intermittently, without producing excessive vehicle speed. Thus the average power output actually taken from an automotive engine is a small fraction of the intermittent peak demands for acceleration. In a steam boiler, power may be generated independently of the rate at which it is converted by the engine, which, for short periods may have a higher rate of output, and hence the "flexibility" of the steam power plant. The present invention provides a transmission system having kinetic energy storing means whereby the same result may be obtained with an internal combustion engine, despite the fact that the output of such engines themselves cannot exceed, even momentarily, the rate of energy development in the combustion chambers.

Accordingly, in this invention, the engine does not drive the vehicle directly but is used to keep a massive flywheel energized to high speeds, and the vehicle is controlled by progressive changes in the driving ratio between this flywheel and the driving wheels. Thus, by means of any suitable form of progressively variable speed gear the vehicle is accelerated by reducing the relative flywheel speed, while the energy given up during deceleration is returned to the flywheel by progressively increasing the relative speed thereof by change in the transmission ratio.

The energy stored in a moving mass is proportional to the square of its velocity of motion. Thus, if a flywheel rim be energized to a rim speed of ten times the maximum vehicle speed and the flywheel has two percent. of the weight of the vehicle, then by abstracting one-half of the energy in such a wheel sufficient power is available to accelerate the vehicle from rest to maximum speed. Such acceleration to maximum speed involves reducing the flywheel speed, the higher speed being 41% greater than the lower speed with the proportions cited. Deceleration of the vehicle from full speed to a stop will return the energy to the flywheel increasing its speed in like ratio. It is a fundamental of this system that the rate of energy interchange between the flywheel and the vehicle (by mere change in the driving ratio therebetween) is limited only by the tractive capacity of the driving system, and is quite independent of the rate at which the engine is capable of energizing the flywheel. Thus the maximum acceleration and deceleration with any given percentage of the total vehicle weight on the driving wheels will be as great as the maximum deceleration now obtainable by brakes effective on the same wheels. Within this limit of slipping of the driving wheels, the change in vehicle speed will respond, without lag, to the rate of ratio change by the operator.

In the drawings:

Fig. 1 is a part axial section on the line 1—1 of Fig. 2 with a detail section through the axis of an "hydraulic" control cylinder;

Fig. 2 is a transverse section on the line 2—2 of Fig. 1;

Fig. 3 is an enlarged transverse vertical section of the servo control mechanism illustrated in Fig. 2, and Fig. 4 is a diagrammatic plan view indicating a vehicle with the internal parts of a suitable transmission shown in section.

In Figs. 1, 2, and 3, 10 designates a portion of the crankcase of an engine, having a crankshaft 12 to which is secured, as by bolts 14, a conventional flywheel 16. The bolts 14 also secure the inturned flange 18 of a one-way coil clutch 20 engaged within a drum 22, the latter being furnished with a plurality of journals 24 on which are mounted planetary gears 26 engaging an annular gear 28 fixed to the housing 30 (which is in turn fastened to the crankcase) by bolts 32. The planetary gears 26 also engage a flywheel pinion 34 integral with a sleeve 36 which is free to turn on bushings 38 upon a driving shaft 40 of a variable speed transmission indicated, in outline only, at 42. The specific form of variable transmission used does not comprise a part of the present invention since, as hereinafter more fully explained, any progressively variable speed transmission including a one to zero speed ratio between the driving shaft 40 and driven shaft 41 may be used. Suitable transmissions for the suggested environment are disclosed, for instance, in my U. S. Patents Nos. 2,040,830; 2,040,831; 2,040,832; 2,040,833; 2,041,284; 2,061,895; 2,061,896; 2,079,679; 2,079,680; 7,079,681 and 2,100,630, although the type transmission disclosed in Patent No. 2,061,895 (of the above group) more closely approaches that type of transmission shown diagrammatically in Fig. 4 than any of the others. The driven shaft 41 is connected to the propeller shaft of the vehicle (not shown in Figs. 1, 2, and 3) in the usual way.

The drum 22 carrying the planet journals 24 has a conical portion 44 terminating in a hub 46, splined to the end of the main shaft 40 as shown. This hub supports the extended end of the driving shaft 40 by way of a pilot ball bearing 48.

A massive high speed energy-storing flywheel 50 is keyed or otherwise secured upon the sleeve 36 for rotation with the pinion 34. The planetary gears 26, 28, 34, comprise a step-up gear system whereby the massive flywheel 50 is driven at relatively high speeds from the engine, the coil clutch 20 permitting the flywheel to continue to run independently of the engine which may accordingly be idled (or stopped) whenever the flywheel is energized to a desired maximum speed. The transmission driving shaft 40 will always turn at a lower, but constant speed ratio, to the flywheel 50. The rotative speed of the shaft 40 corresponds in operation, to substantially the maximum crankshaft speed.

The ratio control lever of the transmission is shown at 52, and is suitably connected to the operator's control lever 54. Since the entire speed control of the vehicle is, with this system, vested in this lever 54, extreme ease of operation thereof is desired, for which reason there is inserted the hydraulic servo-control mechanism indicated in general at 55. This mechanism comprises a piston 58 slidable in a hydraulic cylinder 56, and having a hollow piston rod 60 projecting through the cylinder cover 62 to engage the ratio control lever 52. Within the hollow piston rod 60 a control plunger 64 is disposed for relative axial motion which may be limited with respect thereto by stop shoulders 66, the control plunger 64 engaging the lower end 67 of the operator's control lever 54. In the mid-position of the control plunger 64 relative to the piston rod 60, ports 68 and 70 in the rod, serving the right and left hand sides respectively of the piston 58 within the cylinder 56, are covered by lands 72, 74 on the plunger. Oil pressure is supplied by way of a connection hole 76 through a pipe (not shown) from the pump 78 (Fig. 2) driven by a worm 80 and worm wheel 82 formed upon the sleeve 22. By means of a hole 84 in the plunger, this oil pressure is communicated to a circumferential recess 86 therein, and thence by diagonal holes 88 to the groove 90 in the control plunger 64. The recess 86 and the groove 90 are on opposite sides of the lands 74 and 72. A central or exhaust groove 92 between the lands communicates through the restricted hole 93 with an exhaust hole 94 drilled axially through the plunger. Obviously, therefore, in the position shown, the ports 68 and 70 are covered by the lands 72 and 74 so that there can be no passage of oil to and from the cylinder 56 whereby the piston 58 is locked stationary, holding the ratio control lever 52 at fixed ratio. However, should motion of the control lever 54 to the left be initiated, the control plunger 64 will be moved to the right until the stops at 66 make contact. This relative motion of the control plunger 64 will bring the left hand port 70 into communication with the oil pressure recess 86, and at the same time the port 68 will be put into communication with the exhaust groove 92, thereby bringing hydraulic pressure to bear on the left hand side of the piston 58, and permitting exhaust of the oil from the right hand side thereof, whereby the piston 58 will be moved to the right so long as (and only so long as) the motion is followed by the hand control lever 54. As soon as the operator ceases to move the lever 54, the next increment of movement of the piston 58 will bring the control plunger 64 to the relatively central position shown with respect to the piston, which will thus be hydraulically locked in its new position as previously described. Suitable adjustable stops 96 are provided to limit the travel of this control mechanism.

The purpose of the restriction 93 in the exhaust system previously described is to limit the rate of escape of oil, and so limit the maximum rate of travel of the ratio changing mechanism whilst maintain opposed hydraulic pressures on either side of the piston 58 to positively control against any movement except responsively to the operator's control lever 54. A suitable pressure adjusting relief valve 79 may be incorporated in the pump 78 whereby the maximum rate of control-piston travel may be set to avoid excessive vehicle accelerations which would result from too rapid change in ratio as previously described.

Referring now to Fig. 2, it will be seen that the worm shaft 80 extends through the housing 30 at 98 and carries a yoke 100 to which are pivoted centrifugal governor weights 102, the latter having short arms 104 abutting the control sleeve 106. This sleeve is provided with a groove 108 engaging a control lever 110 mounted on a shaft 112 in the governor housing 114. Said shaft 112 is provided, externally of the housing 114, with a lever 116 connected, as by a link 118, to the lever 120 of the throttle 122 of the engine carburetor 124. A governor spring 126 abuts the control sleeve 106 and is adjustable by means of a screwed bushing 128. A suitable hand control 130 may be added for manually controlling the throttle by overcoming the governor spring 126 and for use only in initially starting the engine with the flywheel and governor at rest.

The rate of increase in radius of the governor weights 102 as they extend by centrifugal force relative to the compression rate of the spring 126 is preferably so selected that whenever a predetermined maximum flywheel speed is reached the increase in centrifugal force with increasing radius is greater than the corresponding increase in spring pressure, so that the throttle will be promptly closed to idle position, and will remain there until a substantial decrease in flywheel speed brings the centrifugal force (despite the large governor weight radius) below the spring pressure, whereupon the throttle will be fully opened and will remain so until the flywheel has been reenergized to full speed.

It is a feature of this invention that the engine is not used at low power factors. Accordingly, maximum efficiency and fuel economy at full throttle and high speed need not be sacrificed to obtain high torque characteristics at low speeds, as is required in engines used with conventional transmission systems.

The rim speed utilized for the flywheel will be the maximum consistent with safe centrifugal stresses using the best known material, and to avoid excessive drag at these very high peripheral speeds, it is necessary to keep the flywheel housing from filling with oil. This may be done by means of a catch slot, as indicated at 132 (Fig. 2), arranged to catch any oil splashed by the flywheel, and return it to the oil reservoir 134. A driver's shut-off valve 136 is preferably included in the passage to the reservoir to permit the flywheel housing 30 adjacent the flywheel periphery to become filled up with oil to give a braking effect, to prevent over-speeding of the flywheel when this is used to restrain the speed of vehicle descent on gradients long enough to overtax the kinetic storage capacity of the flywheel. By shutting off such a return valve the driver may avoid use and wear of the vehicle brakes, even under this exceptional condition.

It should be noted that the flywheel rim speed will be some twenty times the velocity of the usual wheel brake drums, so that a relatively small retarding force at the flywheel rim, will give a relatively great braking action.

As an additional precaution the flywheel is preferably constructed of material having a substantial percentage of elongation before failure, and the housing 30 is machined to a relatively close clearance from the flywheel as indicated in Fig. 2. Thus, should all the other safety devices fail and the flywheel be stressed beyond the initial yield point of the material, the resulting expansion will cause the rim to rub the housing and so slow down the wheel, and give a warning that it has been over-stressed.

Lubrication of the flywheel system is comparatively simple. The pump 78 draws oil from the reservoir 134 through a passage 138 for delivery to a passage 140 registering with an oil transfer bearing 142. A bore 144 in the shaft 40 carries oil to a port 146 between the bushings 38 whence it issues to adequately lubricate these bushings and the gears 26, 34 and 28. From the port 146 the oil is thrown toward the periphery of the flywheel 50, where it is carried, as previously stated, to the catch-slot 132 and thence to the reservoir. Preferably, the reservoir 134 is of a capacity such that the oil contained therein is ample to fill the flywheel housing, lubricate the bearings, and operate the servo control mechanism 55.

It is to be understood that the specific transmission illustrated in Fig. 4 is used for illustrative purposes only and that any rotary transmission giving a speed and torque range including one to zero between two shafts and capable of driving either shaft from the other is within the scope of this invention.

In Fig. 4, parts having the same function as the corresponding parts in Figs. 1, 2, and 3 have been designated by the same reference numeral with the suffix "a".

Accordingly, 10a represents the crankcase and 16a the flywheel of a conventional engine. The flywheel is provided with a one-way clutch 20a here indicated as being of the well-known roller type by which the drum 22a of the main shaft 40a is driven from the engine. The massive flywheel 50a is geared up from this main shaft by suitable gears 24a—34a. In this diagram a laterally disposed flywheel has been indicated instead of a concentric wheel such as that shown in the previous figures, in order to illustrate an alternative disposition.

The transmission comprises an infinitely variable torque and speed ratio connection between the main shaft 40a and therewith the flywheel 50a, and the driven member 41a, to which is secured a conventional propelling shaft 200 driving the rear axle 202, and rear wheels 203 of the vehicle 204 in the usual manner. The ratio control lever of the transmisison is indicated at 52a, and the rod 54a may go to the operator's control with or without the inclusion of the servo mechanism previously described in referring to Figs. 1 and 3.

The internal mechanism of the transmission providing the progressive torque and speed ratio change, including the one to zero condition whereat the propelling shaft 200 (and therefore the vehicle) is held stationary regardless of the speed of rotation of the driving shaft 40a, may comprise, for example: The driving member 206 driven from the main shaft 40a by the torque-responsive loading means 208 and the reaction member 210 restrained from rotation by the torque-responsive contact pressure device 212. Mounted in a cage 214, free to planetize about the main axis, are the arcuate carrier members 216 having spindles 218 whereon are mounted, in paired driving contact, rollers 220; these roller assemblies being free for rocking action as indicated. The driven member 41a has a crowned contact relation with one set of rollers whereby the contact is shifted radially across the driven member and along the rollers as these are rocked. The rocking action is effected by an outer plurality of levers 222 engaged between the reaction member 212 and the housing, and by the inner plurality of levers 224 engaged between the driving means 208 and with an abutment 226 on the main shaft 40a. These two sets of levers extend towards each other and their extended ends are restrained to unitary axial motion by the grooved ball thrust races 228. An extension 52a on one of the fixed member levers conveniently comprises the external control connection wherefrom all the levers are moved simultaneously. The effect of such movement is to relatively advance and retract the driving member 206 and the reaction member 210, thus rocking the roller contact across the driven disc 41a.

When the contact on the driven disc is opposite to the contact of the driving member 206, as shown, the transmission is in one to one ratio, and when the driven disc contact is opposite to the contact of the reaction or fixed member 210, the transmission is in one to zero ratio, holding the driven shaft 200 to zero rotation regardless of the speed of the driving member 206 and the associated flywheel 50a and engine 10a.

To realize the regenerative operation, which is one of the prime objectives of this invention, it is essential that the transmission be of "reversible" type, i. e., it must be equally capable of transmitting power from the propelling shaft 200 to the energy-storing flywheel 50a for deceleration of the vehicle, as for the normal driving from the flywheel 50a to the vehicle. It should be noted further that the transmission should be a true torque converter, wherein the torque and speed relations between the connected shafts vary in inverse ratio. Transmissions affording a mere speed change between two shafts without the corresponding change in torque ratio are of relatively little value for the purpose of this invention.

It will also be noted that since the transmission must be held at zero ratio whenever the vehicle is stopped, it is essential that it be of a type which preserves rolling contact in zero ratio, as distinct from spinning or skidding contact, such as occurs when one disc at right angles to another is brought to contact at the center thereof. All of the transmissions disclosed in my several copending applications have this required characteristic, although the present invention is not limited to the employment of any one of these specific constructions, but may be practiced with any transmission having the capabilities stated.

The operation of the system is as follows: The engine is first started up, for which purpose the starting hand control 130 is held against the action of the governor spring 126 until the engine has warmed up enough to permit releasing this control to the full-open throttle position urged by the governor spring when the flywheel is rotating at slow speed. Acceleration of the flywheel by the engine through the coil clutch 20, 22, and the planetary step-up gears 26, 28-34, will proceed until the flywheel reaches the desired maximum speed, whereupon the governor will shut the throttle. When the vehicle was previously brought to a standstill, the control 54 was necessarily moved to the zero ratio position, so that no movement of the vehicle can occur during this energizing period. The vehicle is then accelerated from rest and its speed completely controlled by change in the ratio between the flywheel and the rear wheels by movement of the driver's control lever as stated. It should be noted that the entire speed control of the vehicle is vested in this one lever, there being no driver's clutch or accelerator pedals, while deceleration of the vehicle is accomplished by increasing the relative flywheel speed through the ratio control, whereby the energy taken out of the vehicle is stored up in accelerating the flywheel. The opening up, and shutting down of the engine is out of the control of the driver, and is effected instead by the automatic governor which opens up the engine fully whenever the flywheel becomes de-energized below a pre-set minimum speed. It should be again emphasized that the rate of energy interchange between the flywheel and the vehicle is independent of the rate at which the engine is capable of energizing the flywheel, the practical limits being the physical strength of the transmission system, the slipping point of the driving wheels on the road, and the comfort of the passengers. The maximum rate of movement of the hydraulic control may be adjusted to be within these limits as previously stated.

I am aware that variable speed transmissions have been used in automobiles in conjunction with normal flywheels rigid with the engine crankshaft. Engine speeds, and the space available for the flywheel diameter, are so limited, however, that the energy storing capacity of such conventional flywheels is insignificant compared with the energy involved in accelerating and decelerating the vehicle through its speed range. The gearing-up of the energy-storing flywheel of this invention enormously increases its energy-storing capacity. For instance, a 5 to 1 gear ratio gives 25 times the stored energy capacity with the same flywheel weight, and to obtain 100 times the storing energy of the normal flywheel it is necessary to use only 4.6 times the weight if a 4.6 gear ratio is used. The equivalent directly driven flywheel would have to be 100 times the normal weight which would be prohibitive for most uses. Thus the gearing-up of the flywheel above the practicable engine speed limits paves the way for a new and novel mode of operation. Moreover, with the conventional flywheel, rigidly secured to the engine shaft, the very small amount of energy which the wheel is capable of absorbing by acceleration from the vehicle through a variable speed transmission is entirely masked by the friction H. P. losses in the engine which bring the normal flywheel to rest very shortly after shutting off the power. The one-way-only drive from the engine to the energy-storing flywheel of my invention overcomes this serious limitation. I am also aware that flywheels have been geared-up with respect to a power source to increase their energy-storing capacity, but such geared-up flywheels have not, within my knowledge, been combined with a variable speed transmission means for regenerative operation.

Again it should be emphasized that the rate of energy interchange by progressive variation in the velocity ratio between two moving masses is proportional to the rate of ratio changes alone and is wholly independent of the rate (the H. P.) at which the system was originally energized, or by which energization of the system as a whole is maintained. The practical limit to the H. P. usable for acceleration of the vehicle in this invention is set by the physical strength characteristics of the transmission means.

It is also obvious that between any start and stop the power used for the gross accelerations of the vehicle must equal that of the gross decelerations, and by the regenerative system herein disclosed, each acceleration is effected by energy stored in the flywheel from the previous deceleration, and that the acceleration performance is quite independent of the H. P. of the engine, which has only to supply the power needed to overcome parasitic and tractive resistance, and for hill-climbing, protracted beyond the storage capacity of the flywheel. This capacity represents a certain vertical elevation of the vehicle, and within this total rise the steepness of a gradient makes no difference to the speed at which it may be negotiated up to the point of slippage of the vehicle driving wheels.

In describing the servo control mechanism 55 of the preferred embodiment, the control plunger 60 is described as provided with a stop 66 limiting its travel relative to the piston whereby a follow-through control action is obtained. If desired, this stop 66 may be eliminated, and the parts organized for quick movement of the control lever in advance of the responsive control piston movement to any desired new ratio position. The piston will then automatically proceed to the new position at a rate determined by the area of the exhaust restriction 93 and the setting of the pressure regulating valve 79, this rate determining the rate of ratio change and therefore the rate of vehicle acceleration as previously described. This suggested minor structural modification has the advantage that the operator has only to touch the control lever long enough to move it to any desired new position, whereupon the ensuing vehicle acceleration to that speed will proceed automatically while the hand of the operator may be otherwise engaged as, for instance, in steering. There is nothing, however, to prevent the operator from using less than the maximum rate of acceleration by the appropriate slow movement of the control. In any case, a single operator's control is all that is required for the entire speed change control of the vehicle.

In actual use, full acceleration of the vehicle involves some loss in flywheel speed, and the vehicle will accordingly accelerate to a slightly lower speed than indicated by the pre-setting of the control lever, and will then make up the difference quite slowly as the engine accelerates the flywheel to replace the energy abstracted therefrom. It should also be obvious that even though the driver moves the control lever to its full extent in anticipation of accelerating to the maximum vehicle speed he may at any time abandon his intention and by appropriate retraction of the lever at any instant, he can hold the speed gained, or, by further retraction, decelerate the vehicle. In short, acceleration and deceleration start instantly the lever is moved to a new position, the time through which the acceleration persists, and therefore the final vehicle speed, being directly proportional to the extent the lever is shifted.

While the single operator's control is illustrated and described as a hand lever, it is at once apparent that a pedal control can be used instead. Particularly is this true since the usual accelerator pedal for controlling the engine throttle is eliminated. Also, if desired, the usual brake pedal may be dispensed with, or, in any event, relegated to emergency use alone. For conciseness, the means to be driven is herein referred to as a "vehicle". Such terminology is not to be strictly interpreted as the scope of the invention may well embrace and include many and varied forms of driven means.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In combination with a mass to be driven and a rotating inertia mass, means for transmitting energy from the mass to be driven to the inertia mass when it is desired to decelerate the former and for transmitting energy from the inertia mass to the mass to be driven when it is desired to accelerate the latter, said means comprising a mechanical power transmission having a progressively variable speed ratio, and means for progressively varying at will the ratio of said transmission so as to effect a gradual acceleration or deceleration of said mass to be driven.

2. In combination with a mass to be driven and a rotating inertia mass, means for transmitting energy from the mass to be driven to the inertia mass and for storing it therein when it is desired to decelerate the mass to be driven and for re-transmitting said stored energy from the inertia mass to the mass to be driven when it is desired to accelerate the latter, said means comprising a mechanical power transmission having a progressively variable speed ratio, and means for progressively varying at will the ratio of said transmission so as to effect a progressive acceleration or deceleration of said means to be driven.

3. A system for accelerating and decelerating a mass to be driven to and from a given energy of motion comprising, in combination, a flywheel mass energizable to equal energy of motion, and a transmission including means controllable to vary the relative speed of said masses to and from 1:0 relation at will whereby either is accelerated when the other is decelerated without substantial change in the gross energy in said system, said mass being effective in the 1:0 relationship to hold the mass to be driven at rest.

4. The combination with a power means and a means to be driven, of a flywheel, means to accelerate the flywheel by the power means, means to independently accelerate the flywheel by said driven means, and variable ratio driving means controllable at will to produce said independent acceleration by decelerating the means to be driven.

5. In apparatus of the class described, in combination, a power shaft, an engine and a kinetic motor drivably engaged with said shaft at unitary and multiplied speed ratios respectively, a propelling shaft, and a transmission including means controllable in speed ratio to accelerate said power shaft from said propelling shaft.

6. A transmission adapted for use on an automotive vehicle including, in combination with the engine of the vehicle, a flywheel, means to drive said flywheel from the engine at more than engine speed, a propelling shaft, and means to progressively vary the relative speed between said flywheel and said propelling shaft for the acceleration of either by decelerating the other.

7. A transmission adapted for use on an automotive vehicle including, in combination, a flywheel, means to energize the flywheel to higher than engine speed from the engine of the vehicle, and means progressively variable in torque and speed ratios adapted to accelerate the flywheel by progressively decelerating the vehicle.

8. A transmission system adapted for use on a vehicle including, in combination, a flywheel comprising only a small fraction of the total weight of the vehicle, means carried by the vehicle to energize the flywheel to such relatively high speed as to contain sufficient kinetic energy to energize the vehicle to a given speed, and means to enforce at will a progressively variable speed ratio drive between said flywheel and the vehicle.

9. A transmission system adapted for use on a vehicle including, in combination, a flywheel of such mass relative to the mass of the vehicle as to contain at its maximum rim speed as much kinetic energy as does the vehicle at maximum speed, and a driving connection between said flywheel and the vehicle comprising means to enforce variable torque and speed ratios therebetween, said transmission system by the transfer of energy from the vehicle to the flywheel through said driving connection being adapted, in and of itself, to decelerate the vehicle from maximum speed to a stop.

10. A transmission adapted for use on a vehicle including, in combination, a pair of shafts, means controllable at will by an occupant of the vehicle adapted to drive either shaft from the other at selectively variable ratios, a primary power means carried by the vehicle and drivably engageable with one of said shafts, and a kinetic storage power means carried by the vehicle and drivably engageable with the same shaft as that engaged by said primary power means.

11. A transmission adapted for use on an automotive vehicle including, in combination with the engine of the vehicle, a flywheel, a propelling shaft, a variable speed means adapted to accelerate the flywheel by progressively decelerating the vehicle, and means to drive the flywheel from the engine independently of said first mentioned means.

12. In a vehicle, the combination with a power shaft and a propelling shaft, of a transmission controllable to enforce at will changing driving ratios between said shafts, a flywheel, and means including gearing having a fixed step-up ratio adapted to enforce high speed rotation on said flywheel relative to one of said shafts.

13. In a vehicle having an engine and a propeller shaft, a high speed flywheel, fixed ratio step-up gears for the energization of said flywheel by the engine, and a transmission drivably connecting said shaft and flywheel, said transmission being variable in ratio without affecting the fixed ratio between said engine and said flywheel.

14. In a wheeled vehicle having an engine, an engine-driven shaft, a wheel-propelling shaft, a variable speed transmission means controllable to decelerate said wheel-propelling shaft to rest by the acceleration of said engine-driven shaft, an energy-storing flywheel, and gear means connecting said flywheel to said engine-driven shaft for high speed rotation of the flywheel relative thereto.

15. A transmission adapted for use on a vehicle to regeneratively control the speed thereof including, in combination, a flywheel of such mass relative to the mass of the vehicle as to contain at its maximum rim speed as much momentum as does the vehicle at its maximum speed, and means to accelerate and decelerate the flywheel from the vehicle and vice versa, comprising a progressively variable speed ratio drive between the two, said drive including in its ratio range an infinite driving ratio whereat the vehicle is held stationary regardless of the flywheel speed.

16. A transmission adapted for use on an automotive vehicle including, in combination with the engine of the vehicle, a flywheel, separate means adapted to accelerate said flywheel respectively by and independently of the engine, the means to accelerate the flywheel independently of the engine comprising a variable ratio driving connection between said flywheel and the vehicle, and means to control said independent acceleration at will.

17. A transmission adapted for use on an automotive vehicle including, in combination with the engine of the vehicle, a flywheel, fixed ratio means adapted for one-way transmission of power from the engine to the flywheel, and variable ratio means interconnecting the flywheel and the vehicle and adapted to provide for an interchange of momentum therebetween.

18. The combination with a transmission adapted for use on an automotive vehicle, said transmission including a power shaft and a propelling shaft and means progressively variable from an initial ratio of one to zero therebetween, of an engine drivably engageable with the power shaft, and a flywheel geared up from said power shaft and adapted to accumulate energy from the vehicle as the drive ratio is changed to increase the flywheel speed relative to the propelling shaft speed, and to return energy to the vehicle as the ratio is changed to decrease the relative flywheel speed.

19. A transmission adapted for use on an automotive vehicle including, in combination with the engine of the vehicle, an engine flywheel of normal mass and rim speed, an energy-storing flywheel of several times the mass and rim speed of said first mentioned flywheel, a propelling shaft and a variable ratio means drivably connecting said energy-storing flywheel to said propelling shaft.

20. A regenerative transmission organization adapted for use on a motor propelled vehicle including, in combination, a power shaft, means to drive said power shaft from the engine of the vehicle, a flywheel, means to gear up said flywheel from said power shaft, a propelling shaft, and a variable ratio means having a range including a 1:0 ratio adapted to drive either shaft from the other.

21. A transmission adapted for use on an automotive vehicle including, in combination with the engine of the vehicle, a propelling shaft, a flywheel, means to energize the flywheel to high rotational speed relative to the engine, and a drive means progressively variable from an initial ratio of one to zero between said flywheel and said propelling shaft.

22. A transmission adapted for use on an automotive vehicle including, in combination with the engine of the vehicle, a power shaft, a propelling shaft, means controllable at the will of an occupant of the vehicle to progressively change the driving ratio between said shafts to and from 1:0 ratio whereat the propelling shaft is held stationary regardless of the speed of the power shaft, and a flywheel geared up at fixed ratio from said power shaft.

23. A regenerative transmission between an engine and a driven means comprising a flywheel, engine control means adapted to automatically maintain the flywheel energized to a predetermined minimum speed in excess of engine speed, and means controllable to vary at will the speed ratio between the flywheel and the driven means.

24. A transmission including, in combination, a power shaft, a propelling shaft aligned with the power shaft, an energy-storing flywheel, fixed ratio step-up gears connecting said power shaft and flywheel, and a variable speed means connecting the shafts and adapted to transmit power from either to the other.

25. In a vehicle having an engine and a propelling shaft, a high speed flywheel, transmission means variable in ratio to accelerate said flywheel by deceleration of said propelling shaft and vice versa, and fixed ratio gear means for acceleration of said flywheel responsive to acceleration of said engine independently of said variable ratio means.

26. A driving train between a source of power and a propelling shaft including a power shaft, a one-way driving connection between said source of power and said power shaft, an infinitely variable speed ratio two-way driving connection between said power shaft and said propelling shaft, and a flywheel geared up from said power shaft at fixed ratio.

27. The combination with a translatable vehicular mass, of an energy-storing flywheel mass forming a part of said vehicular mass, and means controllable at will to enforce infinitely variable speed ratios between said masses, the ratio range including 1:0 ratio whereat the vehicular mass is brought to rest by the transfer of its energy of translatory motion to the flywheel mass through acceleration of the latter.

28. A transmission adapted for use on an automotive vehicle including, in combination with the engine of the vehicle, a flywheel proportioned and organized for such mass and rim speed as to be capable of kinetically storing the entire output of the engine over a substantial period, gears connecting said flywheel to said engine, automatic engine control means adapted to open up the engine only as needed to maintain such flywheel energization, and means manually controllable independently of said engine control to regulate the speed of the vehicle, said last mentioned means including a variable speed unit drivably connecting the flywheel and the vehicle.

29. A transmission adapted for use on an automotive vehicle including, in combination with the engine of the vehicle, a flywheel adapted for acceleration to kinetically store the power output of the engine, means to shut off the engine power whenever the flywheel is fully energized, a means to be driven, and a transmission mechanism drivably connecting said flywheel to said means to be driven, said mechanism including driving ratios variable at the will of an operator to control the acceleration and deceleration of the means to be driven independently of such shutting off of the engine.

30. A transmission adapted for use on an automotive vehicle including, in combination with the engine of the vehicle, a propelling shaft, an engine flywheel of normal mass and rim speed, an augmentary energy-storing flywheel having greater mass and rim speed than said first mentioned flywheel, means drivably connecting said propelling shaft and said augmentary flywheel for variable high velocities of the latter relative to the former, means to control said velocity relation whereby the vehicle speed is controlled for zero to maximum at the expense of flywheel speed variations from maximum to minimum, and automatic engine power control means operable to prevent said augmentary flywheel from falling below such minimum speed.

31. In a transmission adapted for use on a motor driven vehicle, a power shaft, a propelling shaft, means controllable to progressively change the driving ratio between said shafts to and from 1:0 ratio whereat the propelling shaft is held stationary regardless of the speed of the power shaft, a flywheel, means gearing up said flywheel at fixed ratio from said power shaft, and a one-way drive connection from the vehicle motor to said power shaft.

32. A transmission adapted for use on an automotive vehicle including, in combination with the engine of the vehicle, a power shaft, a one-way engine-to-shaft driving connection, a flywheel having a massive rim, gears enforcing high speed rotation on said flywheel relative to said power shaft, a propelling shaft, and means for progressively accelerating either shaft relative to the other for interchange of energy between said flywheel rim and the propelling shaft independently of the time of energization of the flywheel from the power shaft.

33. In a transmission, in combination, an engine adapted for full throttle and idling operation, a flywheel, gears drivably associating the flywheel with the engine for energization of the flywheel through a speed range above the maximum engine speed, and a governor means adapted to automatically actuate the engine throttle to maintain the flywheel within said speed range.

34. In a transmission, in combination, an engine, a flywheel, gears for driving said flywheel from said engine at higher than engine speed, a one-way clutch for overrun of said flywheel relatively to said engine, and a governor means adapted to shut down the engine whenever the flywheel reaches a predetermined maximum speed and to open up the engine when said flywheel reaches a predetermined minimum speed.

35. In a transmission, the combination with an engine, of a flywheel adapted by acceleration to high speed relative to said engine to absorb the full power output thereof for substantial periods, means to shut off said power at the end of such period, a means to be driven, and a rotary transmission mechanism drivably connecting the flywheel to said means to be driven, said transmission mechanism being variable as to driving ratio at will to control the speed of the means to be driven independently of the periods of engine operation.

36. In a transmission, the combination with a kinetic vehicle braking system comprising a variable ratio transmission and a flywheel organized for acceleration relative to the vehicle by a change in ratio of the transmission of a safety device to prevent overspeeding of the flywheel comprising a housing enclosing said flywheel, and means to flood said housing with oil when a safe flywheel speed would otherwise be exceeded.

37. In a vehicle, in combination, an engine, an engine-driven shaft, a vehicle propelling shaft, an infinitely variable transmission means connecting said shafts, said transmission including in its infinitely variable speed range a 1:0 ratio whereat one said shaft is held stationary whilst the other shaft is rotating, an energy-storing flywheel, and gear means connecting said flywheel and said engine-driven shaft.

ROLAND CHILTON.